US006459991B1

(12) United States Patent
Takiguchi et al.

(10) Patent No.: US 6,459,991 B1
(45) Date of Patent: Oct. 1, 2002

(54) COLLISION IN RIGHT/LEFT TURN PREVENTION SYSTEM

(75) Inventors: Akihiko Takiguchi, Tokyo (JP); Koji Kubota, Tokyo (JP); Naoya Noguchi, Tokyo (JP); Satoshi Moteki, Tokyo (JP); Harutada Ooya, Tokyo (JP); Hideaki Murakami, Kyoto (JP); Masaya Yamada, Osaka (JP); Hiroshi Takahashi, Yokohama (JP); Akira Kuno, Kariya (JP); Hisashi Ezure, Kawasaki (JP); Tetsuaki Kondo, Tokyo (JP); Ryoji Matsubara, Tokyo (JP); Yasuyuki Ohira, Kawasaki (JP); Kenichi Ohtani, Tokyo (JP); Hiroshi Mashimo, Tokyo (JP); Takao Inobe, Kadoma (JP); Kazumasa Miyamoto, Tokyo (JP); Kazutaka Kawahara, Tokyo (JP)

(73) Assignee: Public Works Research Institute, Ministry of Construction, Ibaraki-Ken (JP)

( * ) Notice: Subject to any disclaimer, the term of this patent is extended or adjusted under 35 U.S.C. 154(b) by 0 days.

(21) Appl. No.: 09/693,519

(22) Filed: Oct. 20, 2000

(30) Foreign Application Priority Data

Oct. 27, 1999 (JP) .......................... 11-305103

(51) Int. Cl.⁷ .......................... G08G 1/16; G08G 1/0967
(52) U.S. Cl. .......................... 701/301; 701/208; 701/24; 340/435; 340/903
(58) Field of Search .............................. 701/301, 300, 701/302, 96, 117, 208, 214, 216, 24, 26; 340/438, 436, 435, 903, 990, 995

(56) References Cited

U.S. PATENT DOCUMENTS 5,270,708 A    12/1993  Hiroyuki .................... 340/905
5,699,057 A *  12/1997  Ikeda et al. .................. 340/435
5,850,176 A *  12/1998  Kinoshita et al. ........... 340/435
5,865,265 A *   2/1999  Matsumoto .................. 180/169
6,057,754 A *   5/2000  Kinoshita et al. ........... 340/435

FOREIGN PATENT DOCUMENTS

DE    198 44 647    4/1999
EP     0 898 258    2/1999

* cited by examiner

Primary Examiner—Tan Nguyen
(74) Attorney, Agent, or Firm—Fulbright & Jaworski, L.L.P.

(57) ABSTRACT

The present invention provides a collision in right/left turn prevention system which can automatically stop a vehicle even when a driver of the vehicle can not correctly grasp a course of a vehicle running in the counter direction because of the road line form or because the counter vehicle is hid behind other vehicles, or when a velocity of the counter vehicle is faster than that estimated by the driver. This system comprises a vehicle running in the counter direction detection means; road surface conditions detection means; database means; vehicle position detection means; vehicles state detection means; determination processing means for selecting any of provision of information to the driver, generation of an alarm, and provision of controls over the vehicle based on information concerning vehicles from the vehicle running in the counter direction detection means, information concerning road line forms from the database means, information concerning a position of the vehicle from the vehicle position detection means, and other information concerning the vehicle itself from the vehicle state detection means, an information output section for providing information or generating an alarm to the driver, and vehicle control means for automatically controlling the vehicle.

4 Claims, 16 Drawing Sheets

ROAD CONDITIONS DETECTION MEANS 2

WITHIN THE CROSSING AND A POINT IN FRONT OF AND BY 30(m) AWAY FROM THE CROSSING

ROAD-TO-VEHICLE COMMUNICATIONS MEANS 6

FIXED POINT INFORMATION DETECTION SUPPORT FACILITY

30(m)

12(m) (LENGTH OF A LARGE VEHICLE)

COLLISION IN RIGHT/LEFT TURN PREVENTION SYSTEM

FIELD OF THE INVENTION

The present invention relates to a collision in right/left turn prevention system which provides a driver of a vehicle with information for danger of a collision based on data concerning vehicles running in the counter direction, road surface conditions near a crossing, and road line form such as a shape of the crossing, and also which automatically stops the vehicle when deceleration by the driver is inadequate, for prevention of a collision with a vehicle running in the counter direction in the right or left turn. The expressions of right turn and left turn depend on whether a vehicle is running on the right or on the left, and causes for a collision in right or left turn with another vehicle in the counter direction and counter-measures for prevention thereof are not different for right turn and for left turn, so that the following description assumes turn to the right, and description for a case of turn to the left is omitted herein.

BACKGROUND OF THE INVENTION

For prevention of a collision of a vehicle with another vehicle running in the counter direction when turning to the right or to the left at a crossing, conventionally a driver of the vehicle visually checks situations on the crossing and then turns to the right or to the left after the driver determines that the right or left turn is possible. Further to insure higher safety, a traffic signal based on the time difference system or that indicating inhibition of turn to the left is provided, and each driver determines the possibility of right turn or left turn by visually checking the signal.

With the conventional system as described above, however, sometimes the traffic signal can not be seen because of a form of the road or because it is hid behind another vehicle running in the counter direction, and in that case the driver can not identify a vehicle running in the counter direction, and an actual velocity of the other vehicle running in the counter direction is higher than that estimated by the driver, which makes it difficult to accurately determine whether it is possible to turn to the right or to the left, and further makes it impossible to automatically stop the vehicles running in the counter directions for prevention on a collision between the vehicles in right or left turn of each vehicle.

SUMMARY OF THE INVENTION

To solve the problems as described above in prevention of a collision of a vehicle with another vehicle when the vehicle turns to the right or to the left, it is an object of the present invention to provide a collision in right turn prevention system which can prevent occurrence of a collision of the vehicle in its right turn with another vehicle running in the counter direction by evading a case where a driver of the vehicle can not accurately determine whether it is possible to turn to the right or to the left because the other vehicle running in the counter direction is not seen due to a form of the road or is hid behind other cars running in the counter directions, and a case where an actual velocity of the other vehicle is faster than that estimated by a driver of the vehicle.

To achieve the object as described above, the collision in right turn prevention system according to the present invention consists of road facilities including vehicle running in the counter direction detection means for detecting a state of a vehicle running in the counter direction on a crossing road, road surface conditions detection means for detecting conditions on a road surface, and on-road database means for storing therein information concerning a line form of a road; and a vehicle having vehicle position detection means for detecting a position of the vehicle, vehicle state detection means for detecting a state of the vehicle, determination processing means for selecting provision of information to a driver of the vehicle, generation of an alarm to the driver, or automatic control for the vehicle, and vehicle control means for providing control for running of the vehicle, wherein the determination processing means in the loaded on the vehicle comprises vehicle running in the counter direction detection means capable of reducing information on vehicles running in the counter direction by treating information concerning vehicles running in the counter direction as information concerning a group of vehicles running in the counter direction, and determination selection means for selecting provision of information to the driver, generation of an alarm, or automatic control over the vehicle based on the information concerning a group of vehicles running in the counter direction, while the road facilities further include on-road processing means for processing information concerning vehicles from the vehicle running in the counter direction detection means, road line form information from the road surface conditions detection means, and road line form information from the road surface database, and because of the features as described above, this system can prevent occurrence of a collision by determining the possibility of collision in right turn based on the information concerning vehicles running in the counter direction, road line form, and the vehicle itself collected by the on-road facilities and giving the information to the driver, and also which can automatically stop the vehicle when it is determined by the determination processing means that there is the possibility of a collision due to inadequate deceleration or for some other reasons.

The collision in right turn prevention system according to the present invention comprises vehicle running in the counter direction detection means for detecting a state of a vehicle in the counter direction on the opposite side of the road; road surface conditions detection means for detecting road surface conditions; on-road database means for storing therein information on line forms of the road; vehicle position detection means for detecting a position of the vehicle now in control; vehicle state detection means for detecting a state of the vehicle; determination processing means for selecting provision of information to a driver of the vehicle, generation of an alarm, or control for the vehicle just about to turn to the right based on the information concerning vehicles from the vehicle running in the counter direction detection means, information concerning road surface conditions from the road surface conditions detection means, information concerning the road line forms from the on-road database means, information concerning a position of the vehicle from the vehicle position detection means, and information concerning a state of the vehicle from the vehicle state detection means; an information output section for giving the information or the alarm to the driver; and vehicle control means for providing controls over running of the vehicle, and because of the features as described above, this system can prevent occurrence of a collision of the vehicle by determining the possibility of a collision based on the information concerning vehicles running in the counter direction collected by the on-road facilities, information concerning the road line forms, and information concerning a position of the vehicle itself and giving the information to the driver, and further can automatically stop the vehicle when it is determined by the determination processing means that there is the possibility of occurrence of a collision because of inadequate deceleration effected by the driver or for some other reasons.

BRIEF DESCRIPTION OF THE EMBODIMENT

FIG. 8 is a flow chart also for operations by on-road facilities in the embodiment;

DETAILED DESCRIPTION OF THE PREFERRED EMBODIMENT

Figure 1:
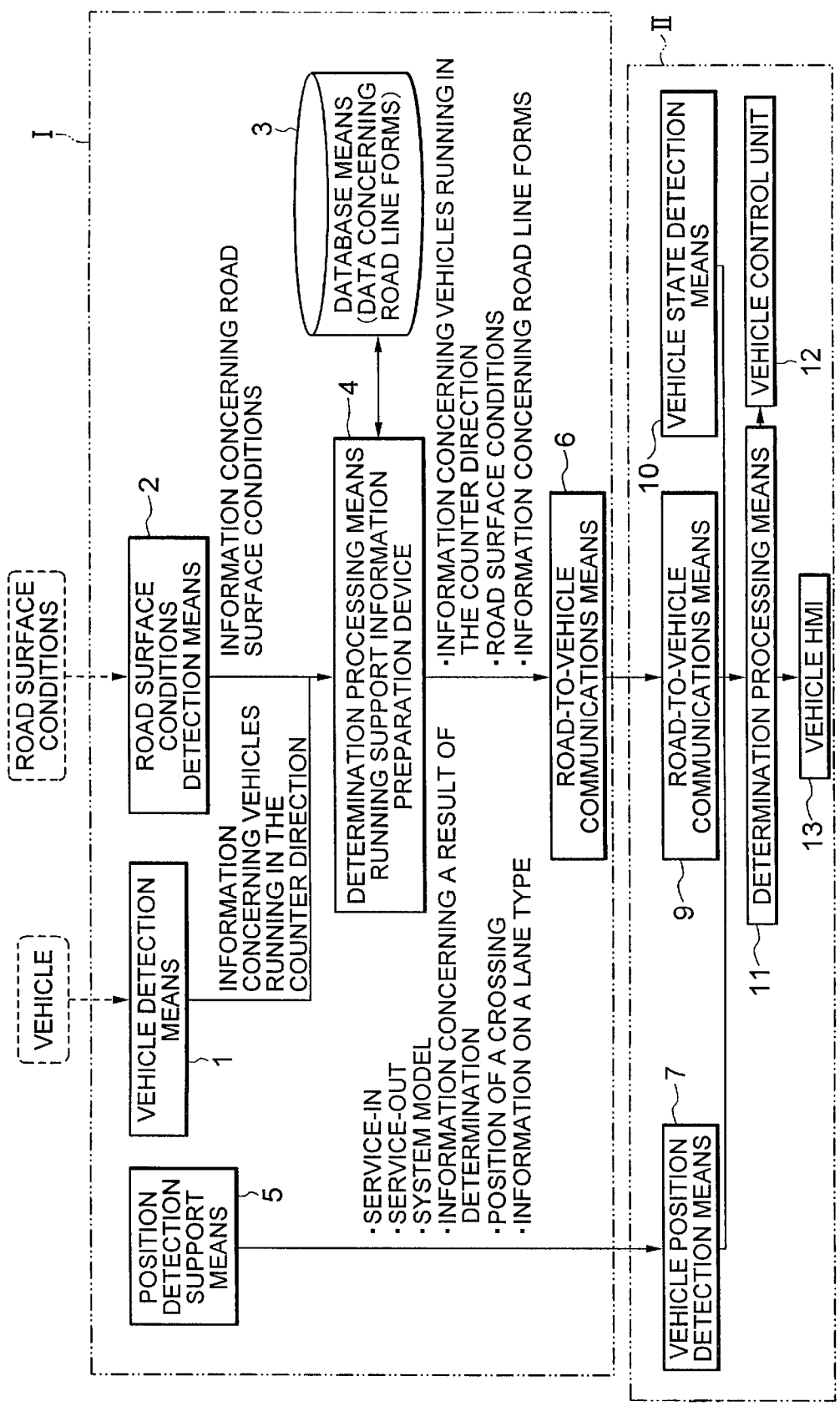
FIG. 1 is a block diagram showing one embodiment of the present invention.

As for on which of a road I and a vehicle II the means, devices, and facilities used in the present invention should be provided, there are several arrangement patterns, but the following description assumes a case where vehicle detection means 1, road surface conditions detection means 2, database means 3, determination processing means 4, position detection support means 5 for supporting detection of a position of a vehicle to be controlled by the system according to the present invention, and road-to-vehicle communications means 6 on a road I.

In the system described above, the vehicle detection means 1 detects a position, a velocity, and other factors of a vehicle running in the counter direction by means of image processing, by electromagnetic means, or in other appropriate ways and provides the information to the determination processing means 4; the road surface conditions detection means 2 detects conditions of a road surface by means of a laser or an infrared detection device and provides the information to the determination processing means 4; the database means 3 stores therein information concerning an object crossing and a road line form near the crossing and provides information to the determination processing means 4 when accessed thereby; the determination processing means 4 executes processing for providing information concerning road line forms stored in the database means or information concerning vehicles running in the counter direction and road surface conditions collected by the on-road facilities to a driver to be served; and the position detection support means 5 supports detection of a position of the vehicle.

Figure 2:
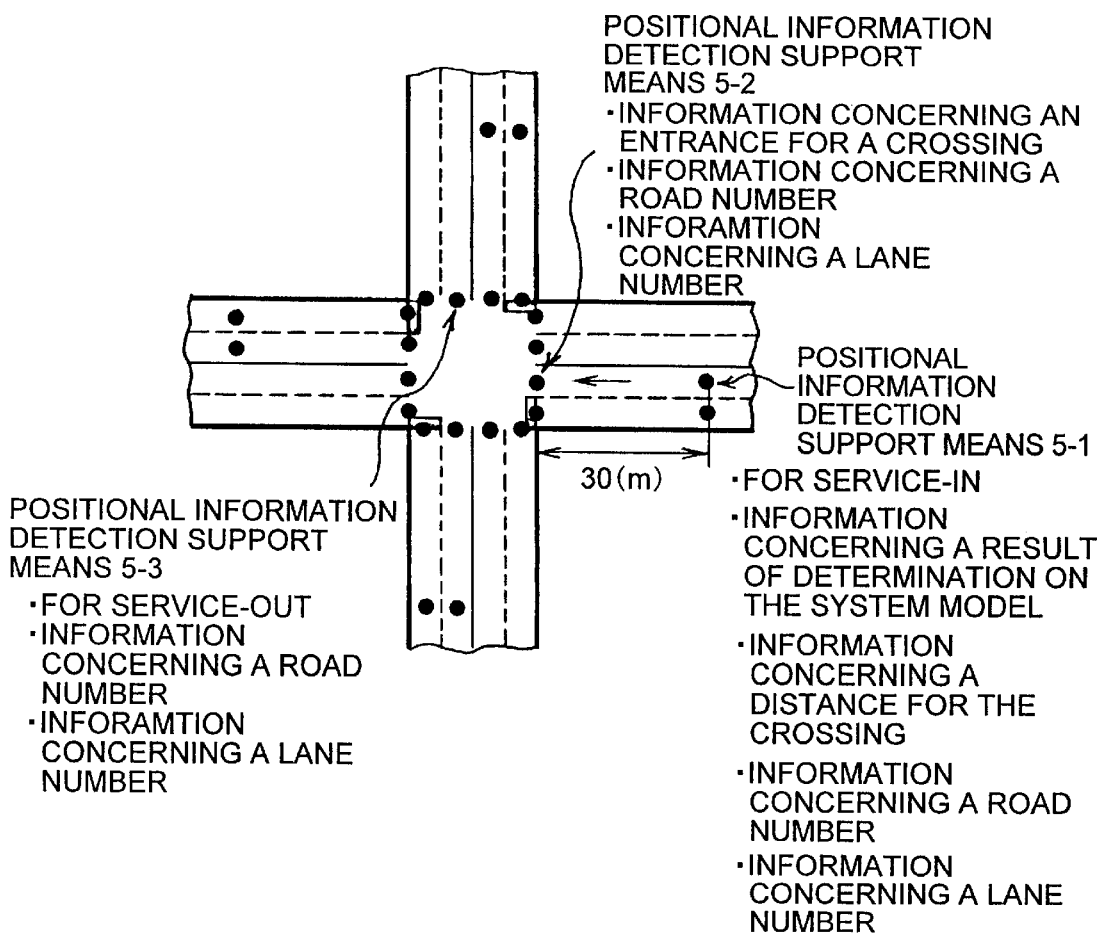
FIG. 2 is a view showing arrangement of position detection support means in the embodiment.
Figure 3:
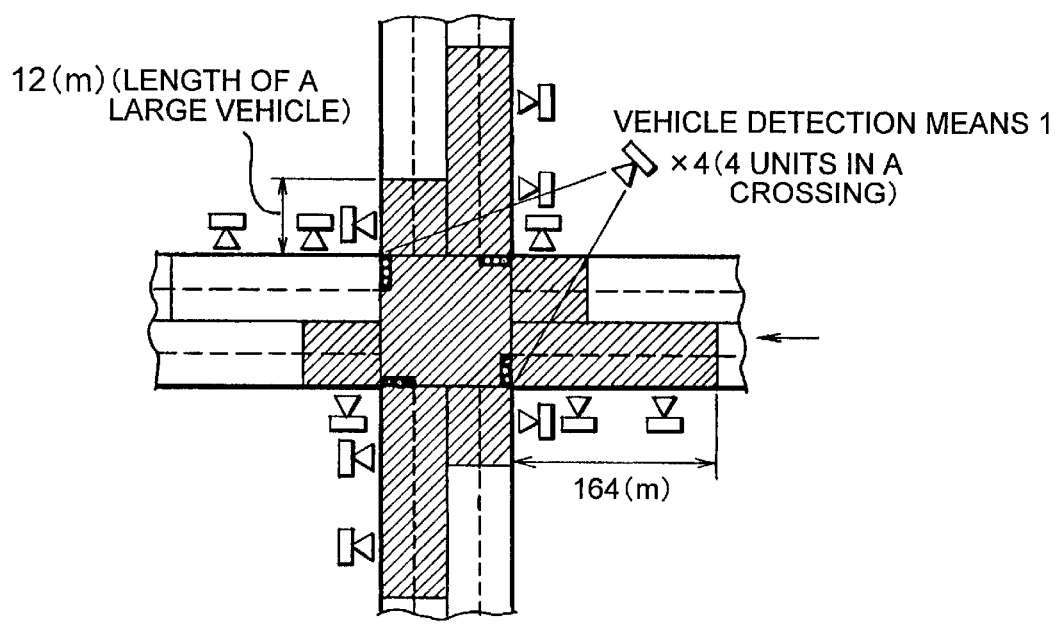
FIG. 3 is a view showing an example of arrangement of vehicle position detection means in the embodiment.
Figure 4:
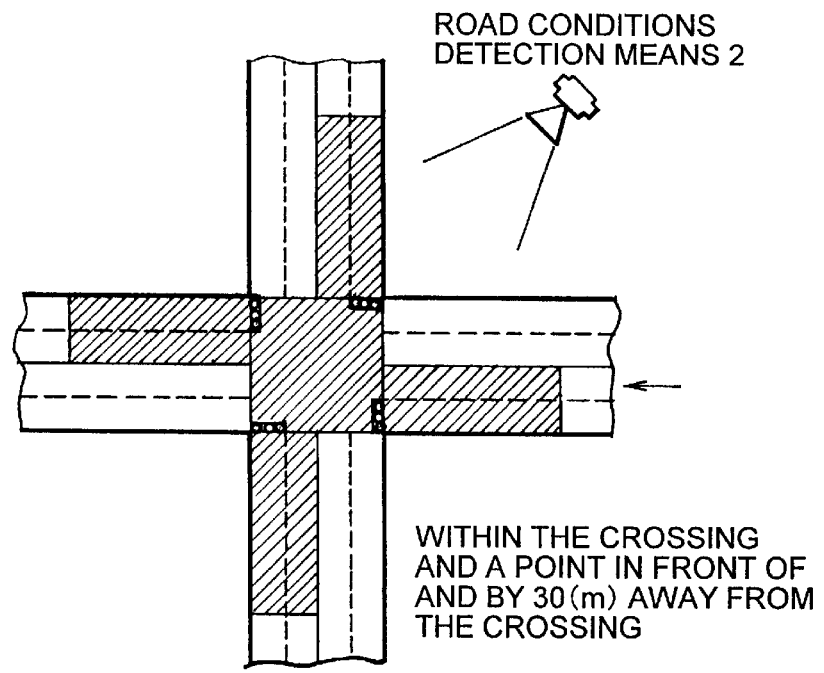
FIG. 4 is a view showing an example of arrangement of road surface conditions detection means in the embodiment.
Figure 5:
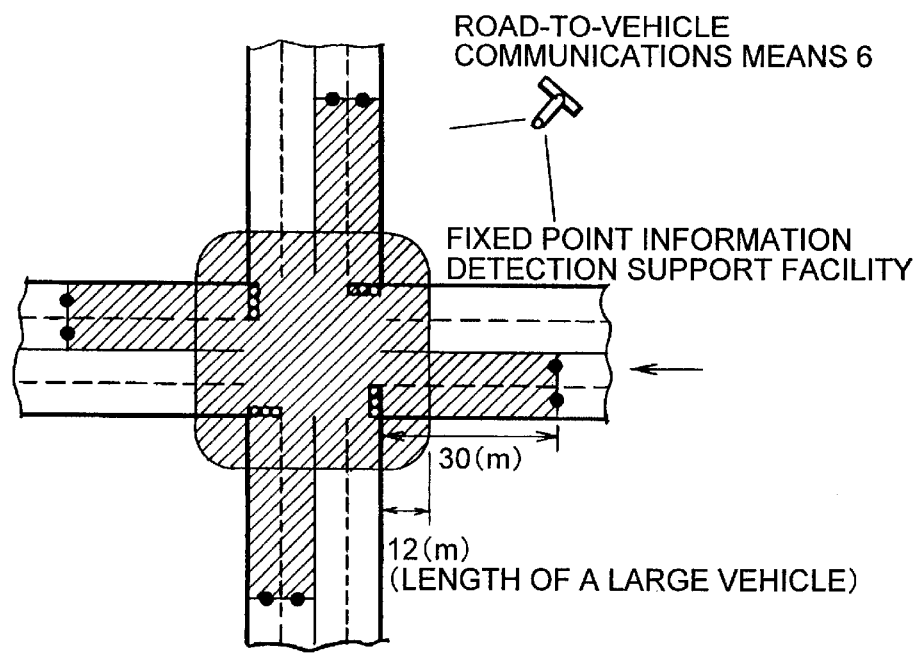
FIG. 5 is a view showing an example of arrangement of road-to-vehicle communications means in the embodiment.
Figure 6:
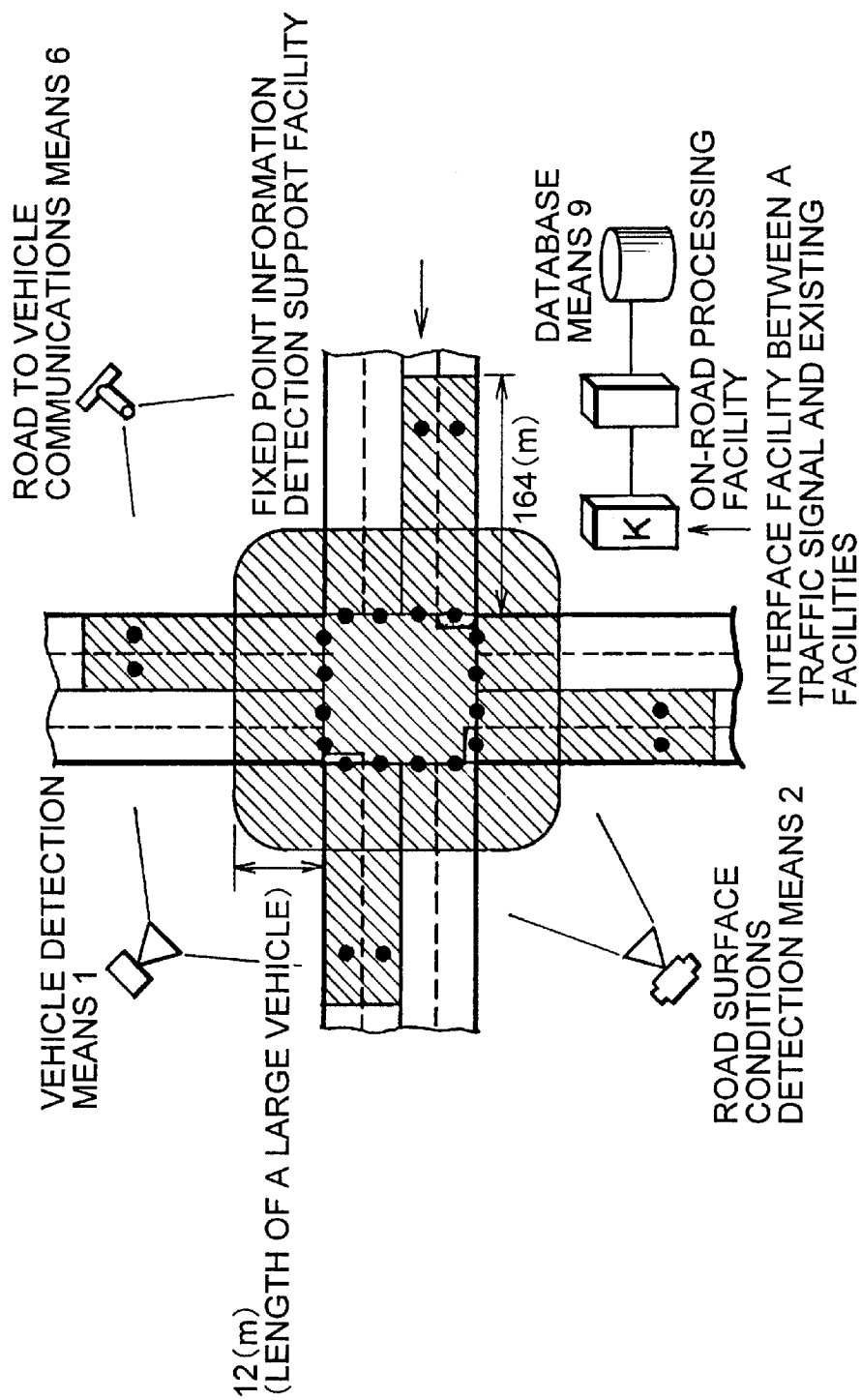
FIG. 6 is a view showing an example of a range of control by each means on the road.

FIG. 2 to FIG. 6 shows examples of positions where main means among those described above are provided near an object crossing as well as ranges of control by the means, and an arrow head in each figure shows an entry direction in which a vehicle just about to turn to the right enters the crossing. FIG. 2 shows an example of arrangement of the position detection support means 5, and in this figure each of the position detection support means 5-1, 5-2, and 5-3 indicates (1) a road number, and (2) a lane number; the position detection support means 5-1 indicates, in addition to the data above, (3) a point for service-in, (4) a result of determination of a system model type, and (5) a distance up to an entrance of the object crossing; the position detection support means 5-2 indicates (3) a point for service-out; and the position detection support means 5-3 indicates (3) information concerning a position of an entrance for the object crossing. FIG. 3 shows an example of arrangement of the vehicle detection means 1, and four units of vehicle detection means 1 are provided at the positions within the crossing as shown in the figure. FIG. 4 shows a range of monitoring by the road surface conditions detection means 2, and the road surface conditions detection means 2 is provided so that it can monitor conditions within the area shown in the figure. FIG. 5 shows a range of communications by the road-to-vehicle communications means 6, and the road-to-vehicle communications means 6 is provided at a position where communications can be performed within the area shown in the figure. The road-to-vehicle communications means 6 is provided at a position outside the crossing as shown in the figure. FIG. 6 shows ranges of controls by the vehicle detection means 1, road surface conditions detection means 2, database means 3, and road-to-vehicle communications means 6.

The vehicle II has vehicle position detection means 7 for detection of a position of the vehicle to be controlled, vehicle-loaded road-to-vehicle communications means 9 for receiving radio signals from the on-road road-to-vehicle communications means 9, vehicle state detection means 10 for detecting a state of the vehicle now in control, determination processing means 11 for receiving signals from the road-to-vehicle communications means 9 and processing the signals, a vehicle control unit 12 for receiving the signals from this determination processing means 11, and a vehicle HMI 13.

Figure 7:
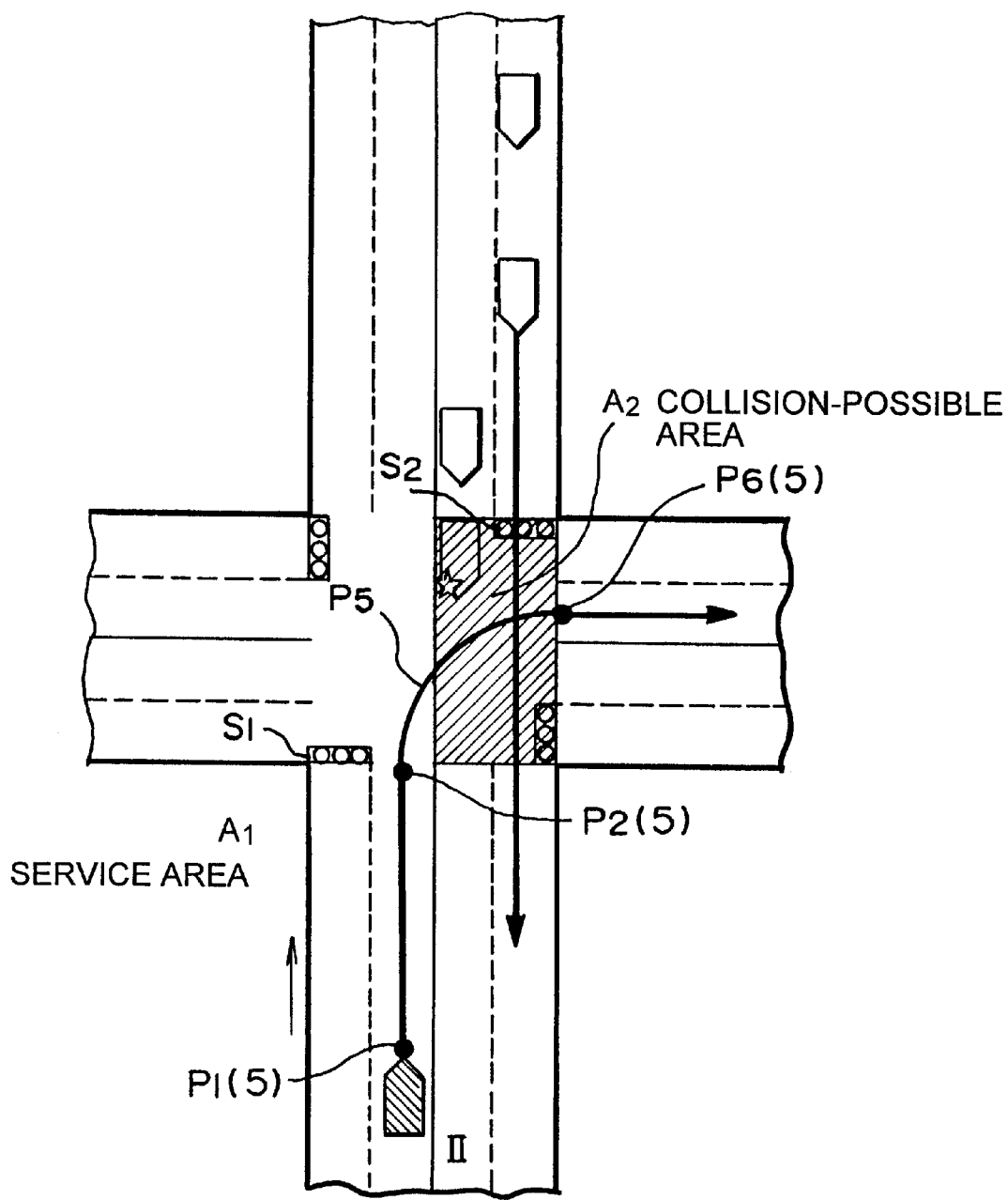
FIG. 7 is an explanatory view showing an operating state of each means on the road.

Operations of the system described above are described below with reference to FIG. 7 through FIG. 18. In FIG. 7 the sign $A_1$ indicates a service area, $A_2$ indicates a collision-possible area, $S_1$, $S_2$ indicates a signal, and the position detection support means 5 are provided in $P_1$, $P_2$, and $P_6$.

In the state as described above, entry of the vehicle II which is an AHS car into the service area $A_1$ is confirmed by the position detection support means 5 at the point $P_1$, with the service-in processing for prevention of a collision in right turn executed, and an operation for detecting a position of the vehicle II is started, and also monitoring of the driver's manipulation is started. Then the vehicle II enters a right-turn allowable lane, and the driver turns on the winker or enters into the lane dedicated to right turn.

Figure 8:
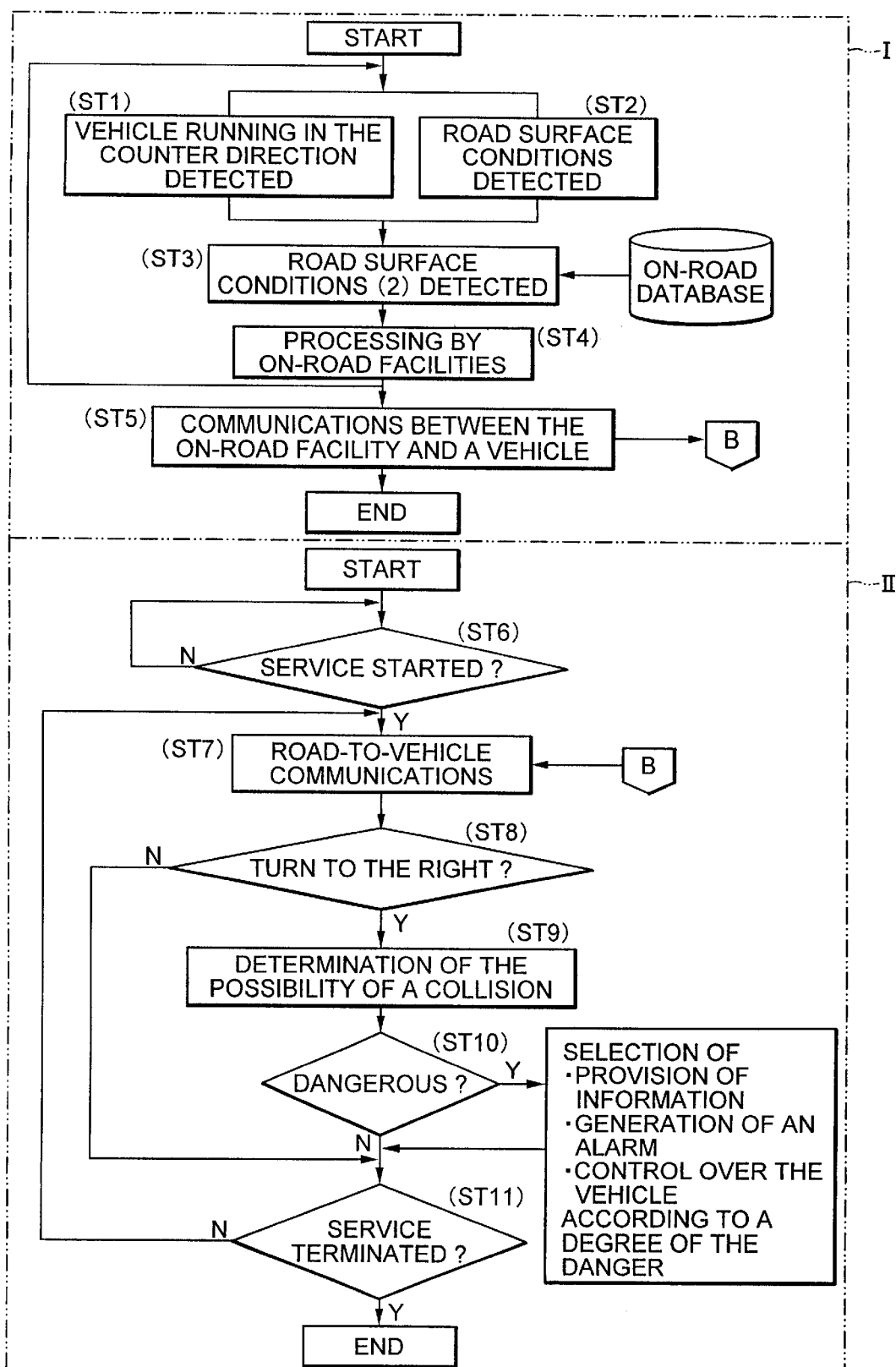
FIG. 8 is a flow diagram of operations by on-road facilities in the embodiment.
Figure 9:
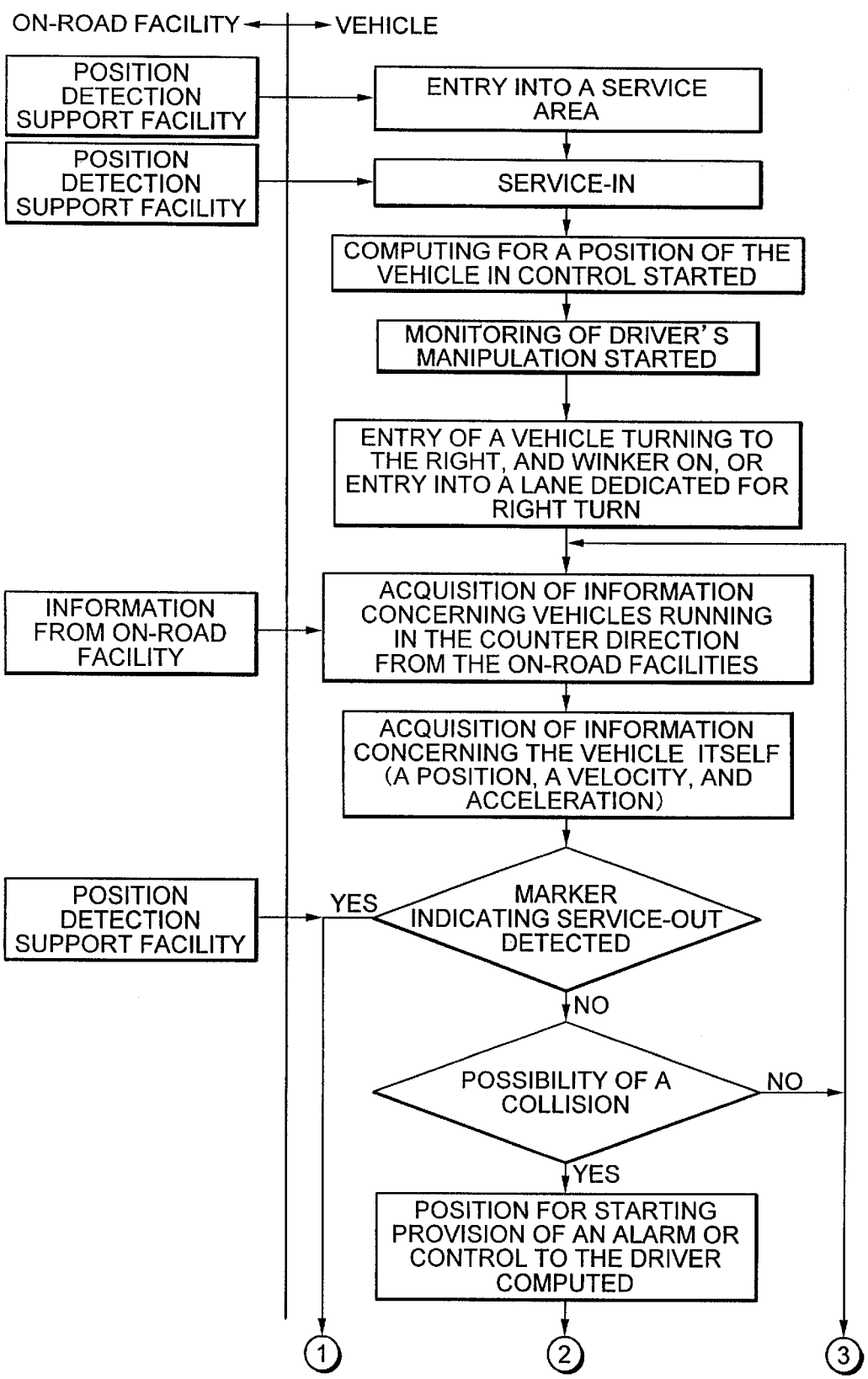
FIG. 9 is a flow chart showing operations in the initial stage of the operation flow above.
Figure 10:
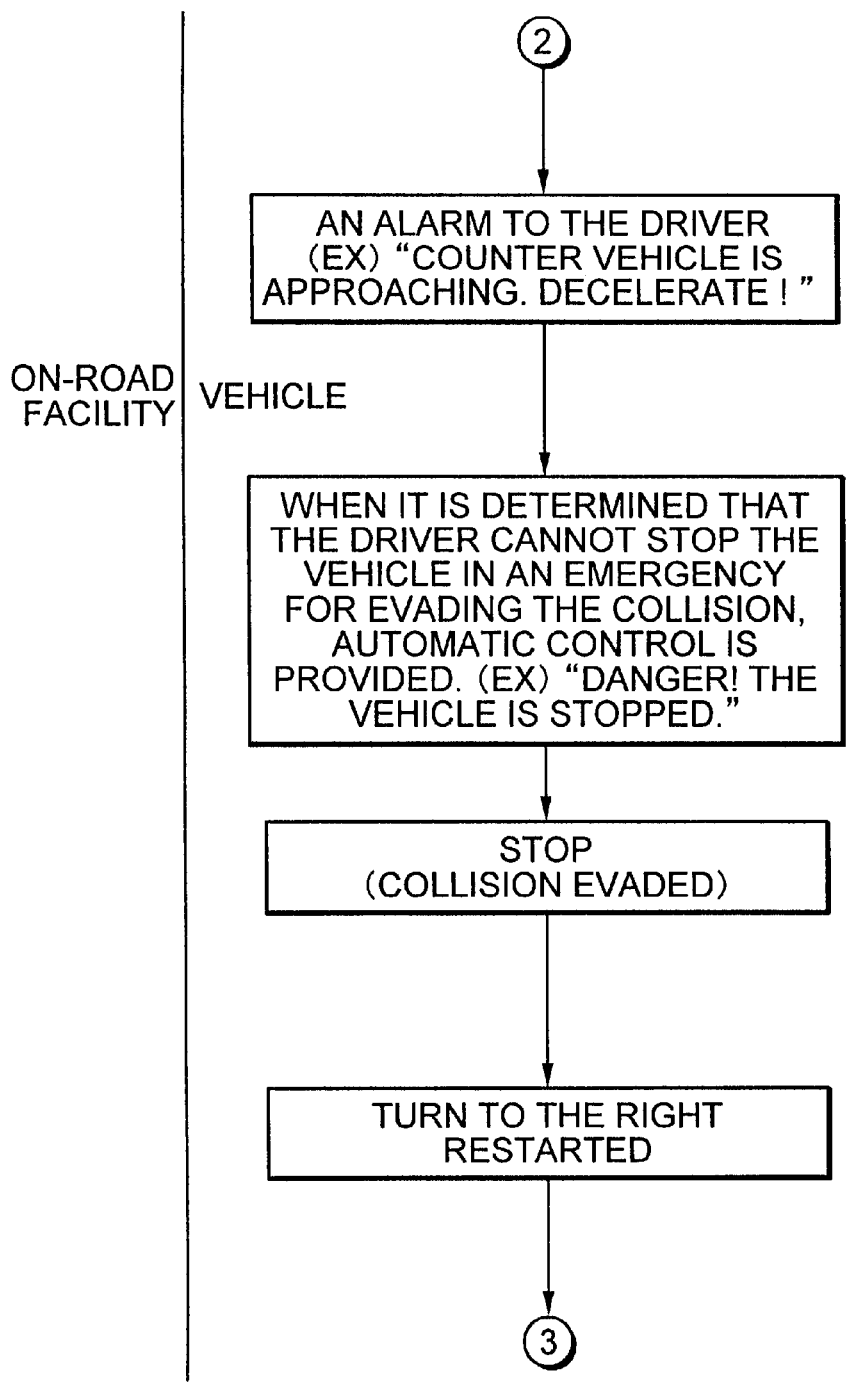
FIG. 10 is a flow chart showing operations in the intermediate stage of the operation flow above.
Figure 11:
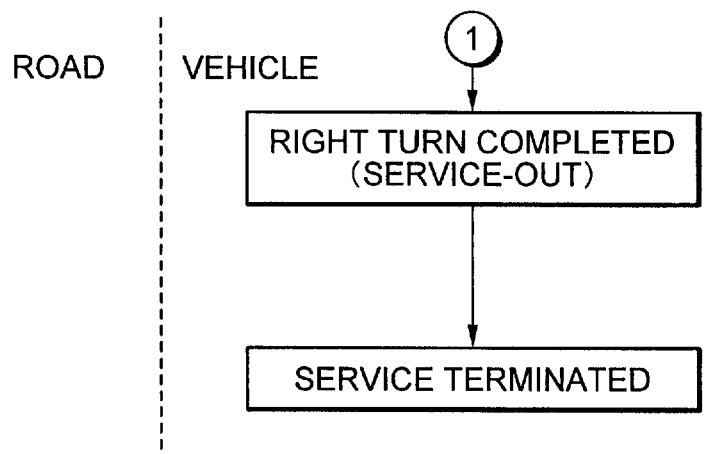
FIG. 11 is a flow chart showing operations in the final stage of the operation flow above.
Figure 12:
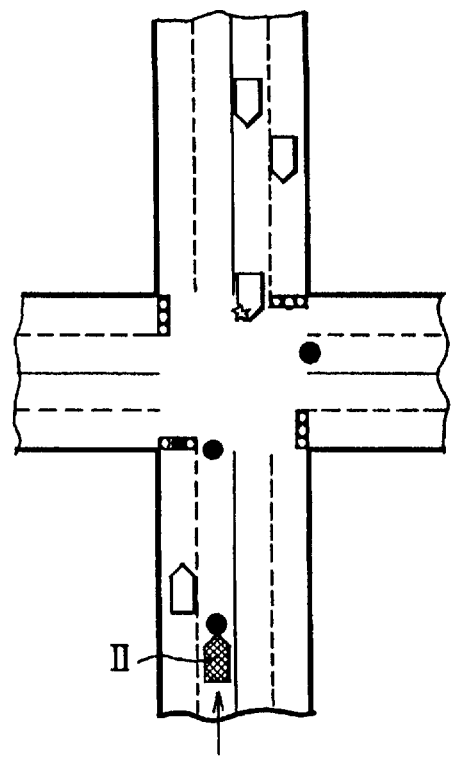
FIG. 12 is a view showing a position of a vehicle when the system operation in the embodiment is started.
Figure 13:
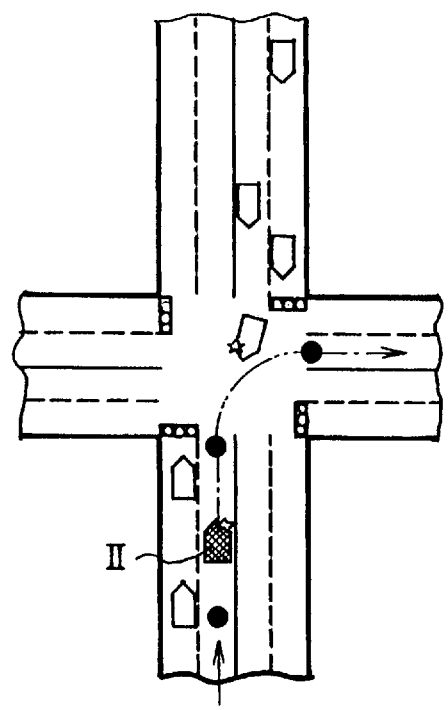
FIG. 13 is a view showing a position of the vehicle in succession to that shown in FIG. 7.
Figure 14:
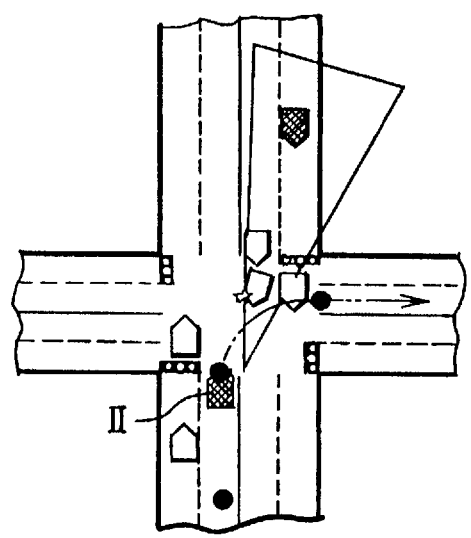
FIG. 14 is a view showing a position of the vehicle in succession to that shown in FIG. 8.
Figure 15:
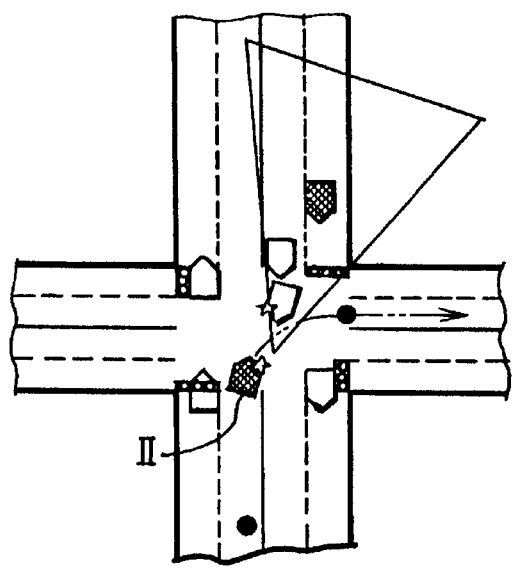
FIG. 15 is a view showing a position of the vehicle in succession to that shown in FIG. 9.
Figure 16:
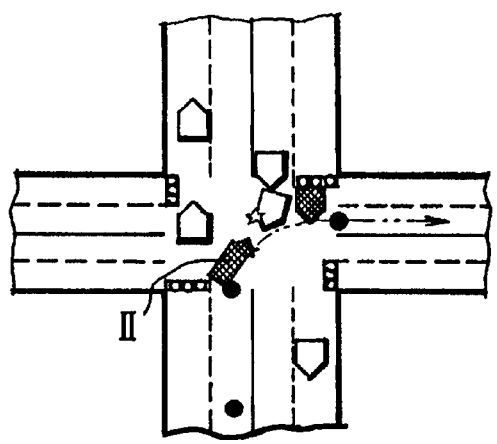
FIG. 16 is a view showing a position of the vehicle in succession to that shown in FIG. 10.
Figure 17:
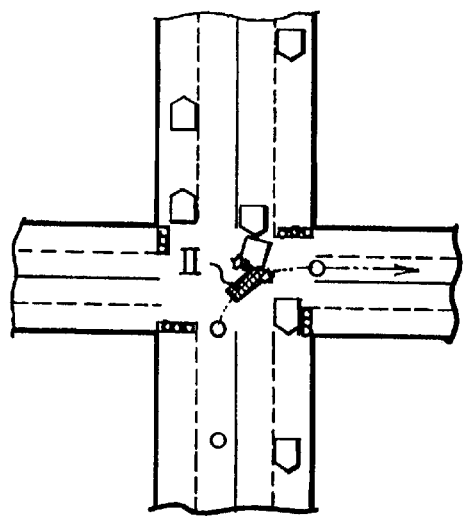
FIG. 17 is a view showing a position of the vehicle in succession to that shown in FIG. 11.
Figure 18:
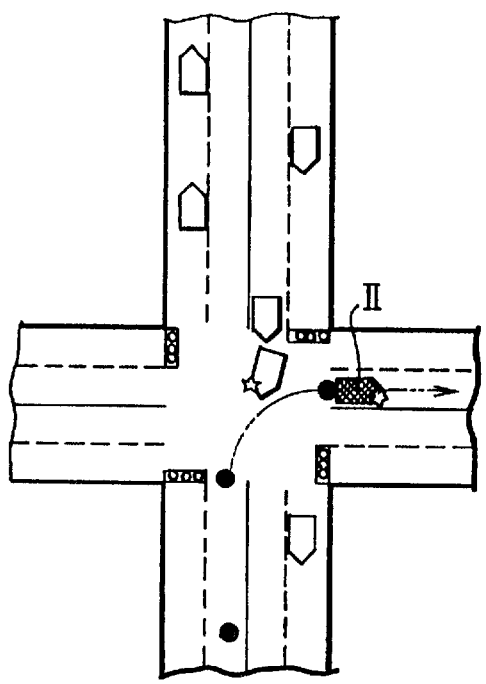
FIG. 18 is a view showing a position of the vehicle in succession to that shown in FIG. 12.

The vehicle II then acquires information concerning vehicles running in the counter direction detected by the vehicle detection means 1 on the road I as shown in FIG. 8 (ST1), acquires information concerning road surface conditions detected by the road surface conditions detection means 2 (ST2), and then acquires information concerning road surface conditions (2) with road line form information from the database means 3 added thereto (ST3). In addition, information is acquired and processed by the on-road determination processing means 4 (ST4), and the information B processed by the determination processing means 4 such as information concerning vehicles running in the counter direction and information concerning road surface conditions is transmitted at a cycle of once for every 0.1 second from the on-road road-to-vehicle communications means (ST5) to the vehicle II.

The vehicle II determines whether the service has been started or not (ST6), and when it is determined that the service has not been started yet, the state at the start of the service is restored. When it is determined that the service has been started, the transmitted information B is received by the road-to-vehicle mans 9 loaded on the vehicle II (ST7), and whether the vehicle II is about to turn to the right or not is determined (ST8), and when it is determined that the vehicle II is turning to the right, it is determined that there is the possibility of a collision (ST9), and then whether it is dangerous or not is determined (ST10). When it is determined that it is dangerous to turn to the right, which of provision of information, generation of an alarm, and provision of control is to be executed is determined according to a degree of the danger. If it is determined that it is not dangerous to turn to the right, the state just after start of the service is restored, and whether provision of the service is to be terminated or not is determined (ST11). If it is determined that provision of the service is to be terminated, the service is terminated. If it is determined that provision of the service is not to be terminated, the state just after start of the service is restored. If it is determined in step 8 (ST8) that the vehicle is not turning to the right, provision of the service is terminated at the point $P_6$ (ST11).

In the operation flow described above, if it is determined in step 7 (ST7) based on a position, a velocity, acceleration, or other parameters of the vehicle II that there is the possibility of a collision with another vehicle running in the counter direction, which of provision of information to the driver, generation of an alarm, or provision of controls over the vehicle II is to be started is selected, and the selected service is started. When it is determined that there is the possibility of a collision, basically the vehicle II should be stopped at the stop point $P_5$ within the lane on which the vehicle II is currently running. Therefore provision of information to the driver is started at the point where the driver can stop the vehicle II in front of the point $P_5$ by normally braking the vehicle II. On the other hand, provision of automatic control over the vehicle II is started at the point $P_4$ when it is determined that the driver can not stop the vehicle II by the stop point $P_5$ by normally braking the vehicle.

As described above, determination of the possibility of a collision is repeatedly executed updating information periodically received from the on-road facilities or the information concerning a position, a velocity, or other parameters of the vehicle II, and provision of the information, generation of an alarm, or control of automatic controls are continuously executed while it is determined that there is the possibility of a collision. When the vehicle completes turning to the right and passes by the point for service-out, provision of the service at the crossing is terminated at the point $P_6$.

Figure 19:
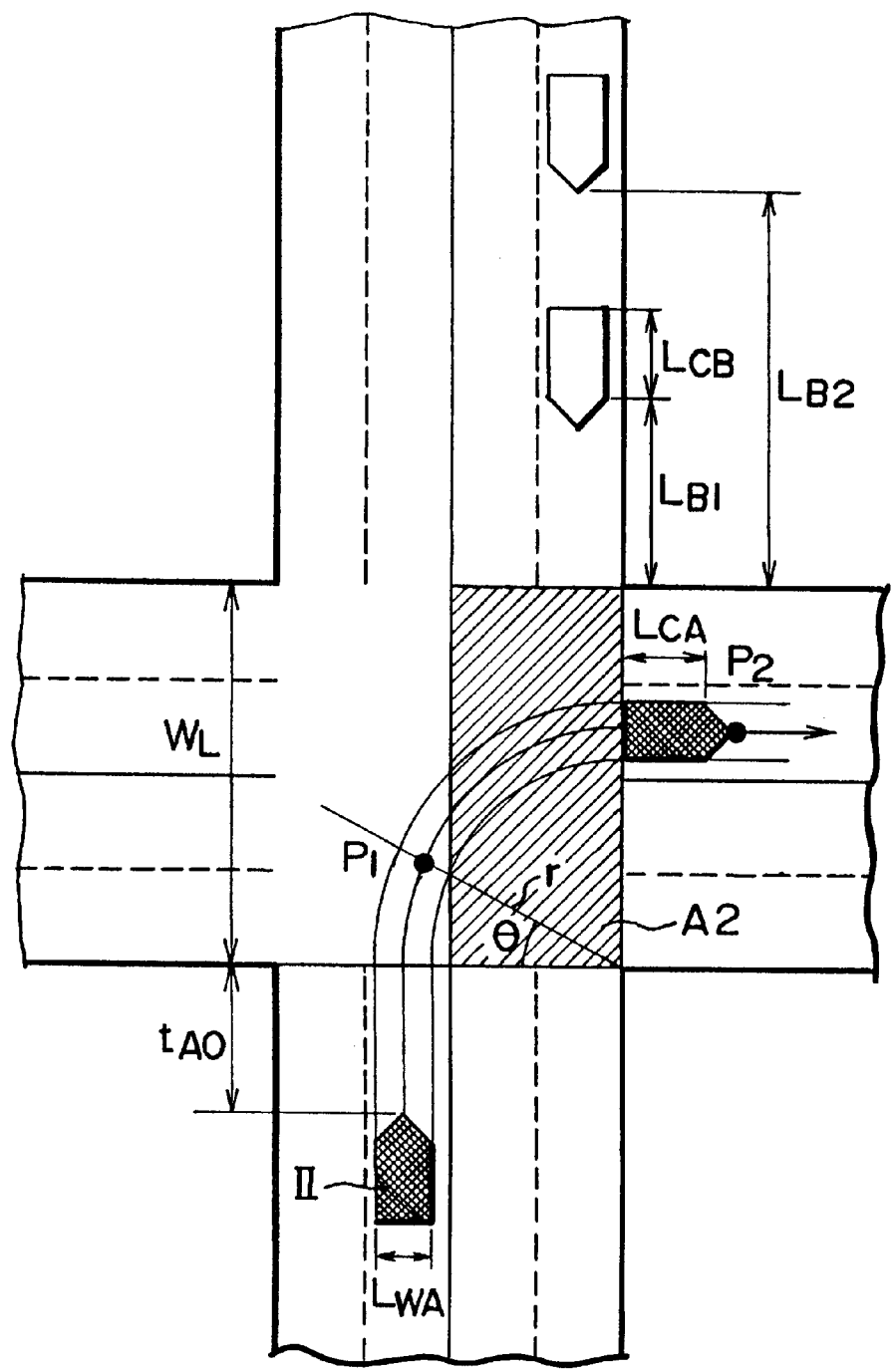
FIG. 19 is a view showing a position of the vehicle in succession to that shown in FIG. 10

An example of the method of determining the possibility of a collision in the present invention is described below with reference to FIG. 19.

EXAMPLE (1) From the time point $t_1$ when a vehicle turning to the right comes to the point $P_1$ on a counter lane within a crossing until the time point $t_2$ where the vehicle passes over the point $P_2$ in the counter lane, if there is any other vehicle running in the counter lane area $A_2$ within the crossing, it is determined that "there is the possibility of a collision". In this case, the time $t_1$, from the time point when the vehicle II just about to turn to the right passes over the point for service-in until the vehicle II runs up to the point $P_{11}$ is expressed by the following equation 1.

$$t_1 = t_0 + \frac{r\theta}{V_R} \quad \text{Equation 1}$$

$$\text{wherein } \theta \cos^{-1}\left(\frac{W_L}{2r'}\right), r' = r - \frac{L_{WA}}{2}$$

(2) The time $t_2$ required for the vehicle II turning to the right to run from the point $P_1$ to the point $P_2$ is expressed by the equation 2 below.

$$t_2 = t_0 + \frac{\pi r}{2V_R} + \frac{L_{CA}}{V_R} \quad \text{Equation 2}$$

In the equations 1 and 2, t: The time required until the vehicle turning to the right runs up to an entrance for the crossing (s)

r: A radius of a curvature when turning along a circle (measured at a center of the vehicle) (m)

$V_R$: A velocity in turn to the right (m/s)

$L_{CA}$: Length of the vehicle turning to the right (m)

$L_{WA}$: Width of the vehicle turning to the right (m)

(3) The distance $L_{B1}$ from a vehicle running in the counter direction and having the highest possibility of a collision to an entrance of the crossing is expressed by the equation 3.

$$L_{Bl} = V_B t_{Al} - W_L - L_{CB} \qquad \text{Equation 3}$$

(4) The distance $L_{B2}$ running in the counter direction and having the lowest possibility of a collision is expressed by the equation 4.

$$L_{B2} = V_B t_{A2} \qquad \text{Equation 4}$$

In the equations 3, 4

$V_B$: Velocity of a vehicle running in the counter direction (m/s$^2$)

$W_L$: Width of the road (m)

$L_{CB}$: Length of the vehicle running in the counter direction (m)

An example of computing for a point to generate an alarm or to start provision of an alarm is described with reference to FIG. 19.

EXAMPLE

The following description assumes a road, a vehicle turning to the right, and a vehicle running in the counter direction each having the conditions as described below.
(Road)

Two lanes in one way+a crossing point

Width of the lane: 3.5 m

Crossing: Square of 14 m–14 m (Vehicle turning to the right)

Width of the vehicle: 1.4 m

Length of the vehicle: 4.7 m

Normal deceleration (Slow braking operation by the driver): 2.0 (m/s$^2$)

Deceleration after information if provided (Normal braking operation by the driver): 3.0 (m/s$^2$)

Deceleration after an alarm is generated (Emergent braking operation by the driver): 4.0 (m/s$^2$)

Deceleration under control (Normal braking operation by the system): 6.0 (m/S$^2$)

Time for idle running (by a driver): 2.0 (s)

Time for idle running(under control by the system): 0.1 (s)

Time for effect of braking: 0.5 (s)

The vehicle is now running at the velocity of 80 (Km/h), and decelerates at the deceleration of 2.0 (m/s$^2$).

The vehicle is running at a center of the lane, and is to turn to the right from an inner lane of a road to an inner lane on the opposite side of the road.

(Vehicle running in the counter direction)

Width of the vehicle: 1.7 m

Length of the vehicle: 4.7 m

The vehicle is now running at the velocity of 80 (Km/h).

(1) Computing for a point where automatic control is to be started

It is assumed that the vehicle turning to the right decelerates to a required level by an entrance for the crossing, and runs within the crossing at the decelerated velocity.

The distance required for braking under control by the system according to the invention is calculated through the equation 5 below.

$$L_A = V_R t_0 + V_R t_1 - \frac{1}{6}\alpha t_1^2 + \frac{1}{2a}\left(V_R - \frac{1}{2}\alpha t_1\right)^2 \qquad \text{Equation 5}$$

$V_R$: Velocity in turn to the right $\alpha$=6.0 (m/s$^2$): Deceleration (Braking by the system in an emergency)

t=0.1 (s): Idling time (System)

$t_1$=0.5 (s): Time required to effect braking

The velocity $V_R$ during right turn was calculated through the equation 7 for computing the recommended safety speed at a curve.

$$V = \sqrt{G \cdot R \cdot f \cdot c} \qquad \text{Equation 6}$$

G: Gravitational acceleration (m/s$^2$)

R: Curvature radius of the road (m)

f: Friction coefficient between a road surface and a tire in sideward sliding c: Safety factor Assuming that G=9.8 (m/s$^2$), $$R = 7 + \frac{3.5}{2} = 8.75 \text{ (m)},$$

f=0.4 (Dry road surface), and c=0.7, the velocity during right turn is 4.9 (m/s) 17.64 (km/h). Therefore the point for starting control is a point by 3.65 (m) away from the stop point in front of the counter lane.

(2) Computing for a point where an alarm is to be generated

The driver decelerates the vehicle at the deceleration of 2.0 (m/s$^2$) to the velocity for turning to the right of 4.9 (m/s) computed in (1) above by a point in front of the crossing to turn to the right thereon. The relation between the distance 1 (m) over which the vehicle II runs until it sops and the velocity V (m/s) is expressed by the following equation 7.

$$1 = \frac{V^2}{2\alpha_1} - \frac{V_R^2}{2\alpha_1} - L_R \qquad \text{Equation 7}$$

wherein $\alpha n_1$ Deceleration of 2.0 (m/s$^2$) by the driver $V_R$: Turning speed of 4.9 (m/s) during right turn $L_R$: Distance over which the vehicle runs from an entrance for the crossing to the stop point The relation between the distance over which the vehicle runs upon the deceleration of 4.0 (m/s$^2$) by the driver by the stop point and the velocity V (m/s) is expressed by the equation 8.

$$1 = V t_1 - \frac{1}{6}\alpha_1 t^2 + \frac{1}{2\alpha_2}\left(V - \frac{1}{2}\alpha_2 t\right)^2 \qquad \text{Equation 8}$$

wherein $t_1$: Time required to effect braking, 0.5 (s)

$\alpha_2$: Deceleration by braking by the driver in an emergency, 4.0 (m/s$^2$)

The distance $L_R$ from an entrance for the crossing to the stop point is calculated through the following equation 9.

$$L_R = r\theta \qquad \text{Equation 9}$$

-continued

Herein, as $\theta = \cos^{-1}\left(\frac{W_L}{2r}\right)$, the $L_R$ is 3.88 m.

The running range l (m) and the velocity V (m/s) at the point where the deceleration of 2.0 (m/s²) effected by the driver for turning to the right changes to the deceleration of 4.0 (m/S²) by the driver in an emergency are calculated as V=5.2 (m/s) and l=4.7 (m) through the equations 7 and 8.

The distance l over which the vehicle runs in idle running under control by the driver for the idle running time of 2.0 s is computed through the following equation 10:

$$l = vt - \frac{1}{2}\alpha t^2 \qquad \text{Equation 10}$$

As V=5.2 m/S², α=2.0 m/s², and t=2.0 s, l is equal to 10.4 m.

Therefore, the point for generating an alarm is by 15.1 m away from the stop point in front of the counter lane.

(3) Computing for a point where provision of information is to be started

When computing the point for starting provision of information to a driver, it is assumed that the driver can stop the vehicle with the deceleration of 3.0 m/S² by the normal braking operation by the stop point. Namely it is assumed that the $\alpha_2$ in the equation 2 is 3.0 m/s².

Figure 20:
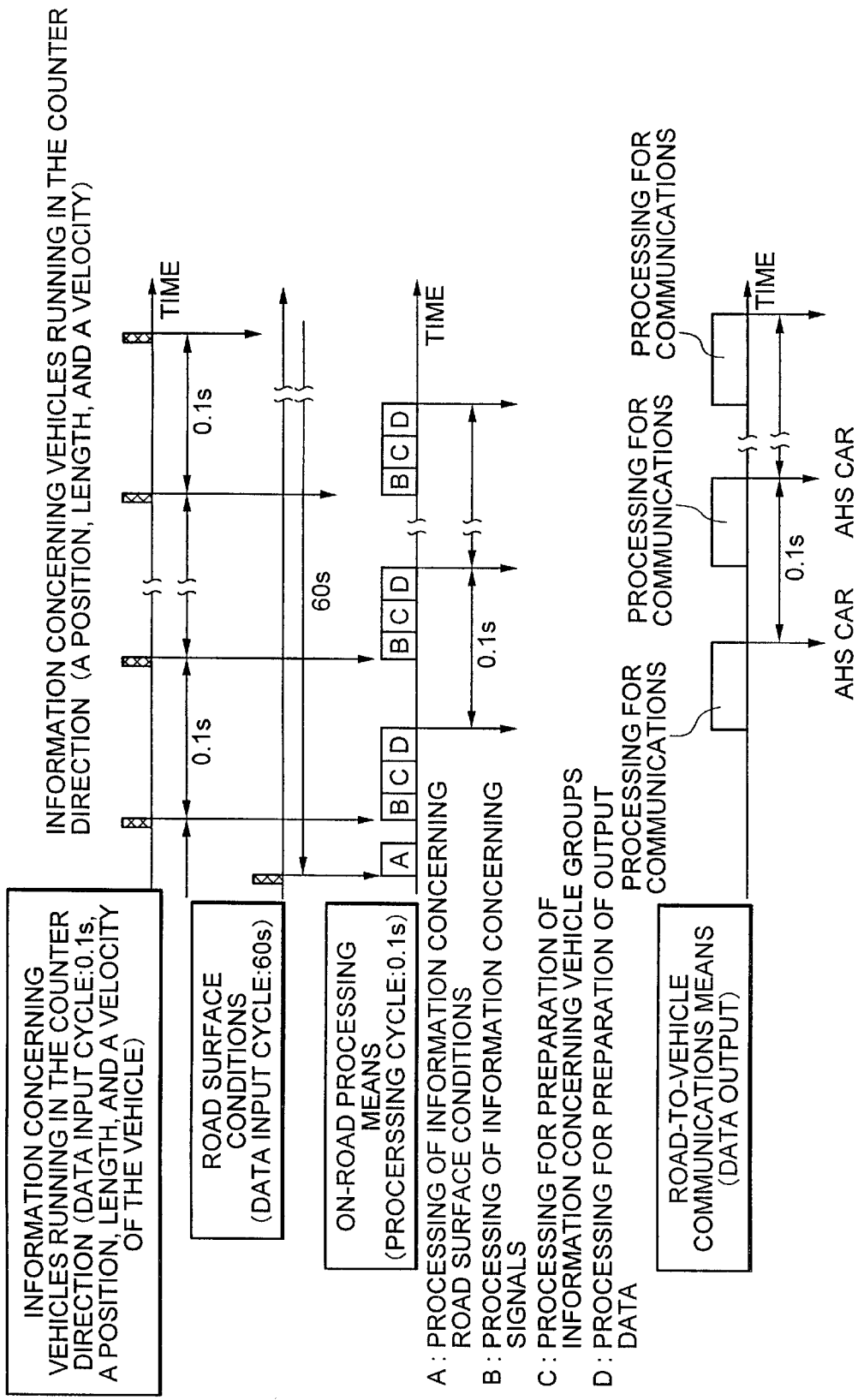
FIG. 20 is a time chart for processing by each means on the road.

The timing for processing information concerning a vehicle running in the counter direction inputted from the on-road vehicle detection system 1, information concerning road surface conditions from the road surface conditions detection means 2, and information inputted from the determination processing means 4, and that for transmission of information by the road-to-vehicle communications means 6 are described below with reference to the time chart shown in FIG. 20. In the figure, as information concerning a vehicle running in the counter direction, a position, a length, and a velocity of the vehicle are periodically acquired at a cycle of 0.1 second from the on-road vehicle detection means 1, and the data is stored in the database means 3. The determination processing means 4 prepares data on a group of vehicles running in the counter direction from the information stored in the database means 3, also prepares output data from the information concerning the road surface conditions (friction coefficient), and stores the data in the database means 3. The road-to-vehicle communications means 6 transmits the prepared information at the cycle of 0.1 second.

Figure 21:
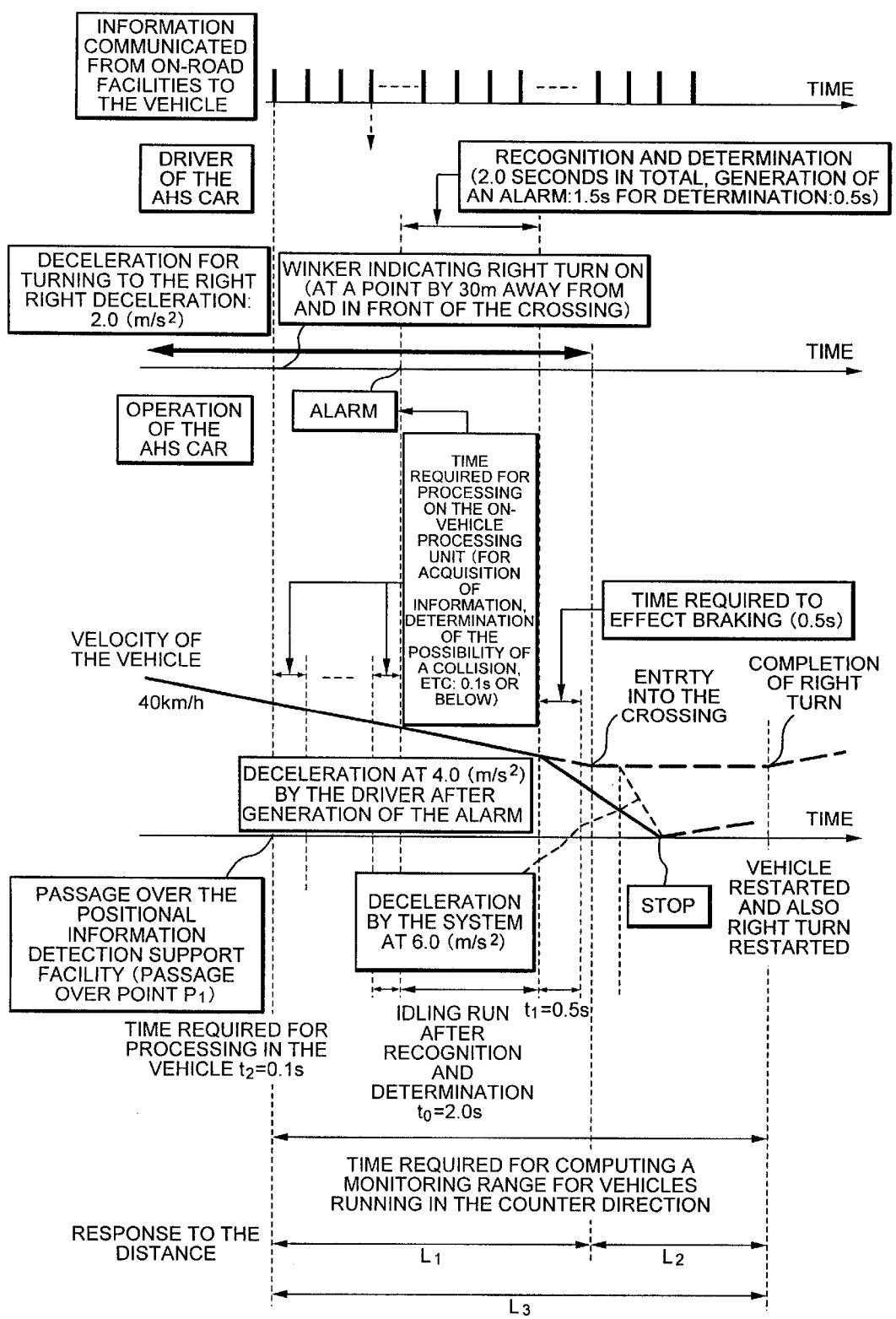
FIG. 21 is a time chart for processing by each means loaded on the vehicle.

FIG. 21 is a time chart for movement of a vehicle and operations by the vehicle's driver in a range of control by the on-road facilities. In this system, vehicles running on the counter lane are monitored from the time point when the vehicle to be controlled starts turning to the right until the time point when the vehicle has passed through the crossing. Therefore the range of control by the on-road facilities is that for monitoring vehicles running on the counter lane from a crossing point, and this monitoring range is computed as described below.

In FIG. 21, the distance $L_3$ over which the vehicle to be controlled runs from the time point when the driver starts an operation of the winker indicating turn to the right at a point by 30 m away from the crossing until the vehicle has passed through the crossing and completed the right turn can be computed through the following equation 11.

$$L_3 = L_1 + L_3 \qquad \text{Equation 11}$$

$L_1$ is 30 m, and the vehicle runs decelerating the velocity to 4.9 m/s for turning to the right with the deceleration of 2.0 m/s². In this case, the running time $t_1$, from the time point when the driver operates the winker for indicating turning to the right until the time point when the vehicle runs to the entrance for the crossing can be computed through the following equation 12:

$$X = Vt_1 + \frac{1}{2}\alpha t_1^2 \qquad \text{Equation 12}$$

Wherein
  X=30 m: Distance from the point for service-in up to an entrance for the crossing
  V=4.9 m/s: Turning speed in turn to the right
  α=2.0 m/S²: deceleration And as $t_1^2 + 4.9t_1 - 30 = 0$, $t_1 = 3.55$ (s).
  $L_2$ indicates the distance over which the vehicle runs from the time point when the vehicle reaches the entrance for the crossing until the vehicle turns along a circle to the right and passes through the crossing can be obtained through the equation 13:

$$L_2 = \frac{2\pi r}{4} + L_C \qquad \text{Equation 13}$$

wherein
  r: a radius of the circle for turning. 8.75 m
  $L_C$: Length of the vehicle, 4.7 m so that $L_2 = 18.44$ m.
  Therefore the time $t_2$ required for the vehicle to run over the distance $L_2$ at the turning speed of 4.9 m/s is $$t_2 = \frac{L_2}{V_R} = \frac{18.44}{4.9} = 3.76 \text{ (s)}.$$

Accordingly, the time $t_3$ from the time point when the driver operates the winker indicating right turn until the time point when the vehicle has passed through the crossing is:

$$t_3 = t_1 + t_2 = 3.55 + 3.76 = 7.31 \text{ (s)}.$$

The vehicle monitoring range $L_3$ for detection of the vehicles which reach the entrance for the crossing within the time $t_3$ is:

$$L_3 = V_B t_3 = 22.2 \times 7.38 = 163.83 \text{ (m)}$$

so that, when the decimal section is rounded up, the distance $L_3$ is equal to 164 m.

Figure 22:
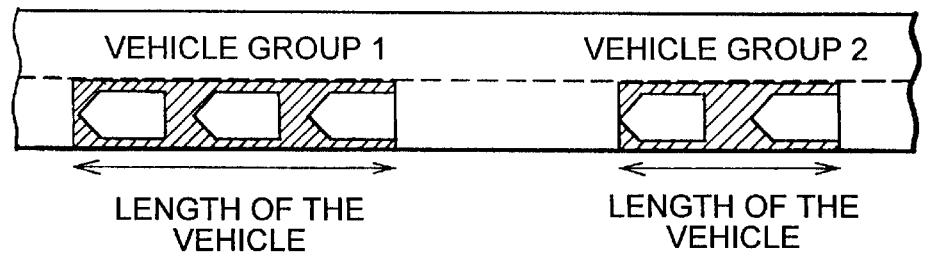
FIG. 22 is a conceptual view showing a group of vehicles in a range of control by the system according to the present invention.

A concept of a group of vehicles as defined herein is described below. A volume of output data can be reduced by treating an inter-vehicle distance as shown in FIG. 22. In FIG. 22, five vehicles are detected by the vehicle detection means 1, but by dividing the five vehicles to a vehicle group 1 and a vehicle group 2, data on each vehicle group can be supplied to the vehicle to be controlled by the system. Herein it is assumed that a vehicle detected within a crossing is not treated as a member of any vehicle group.

Figure 23:
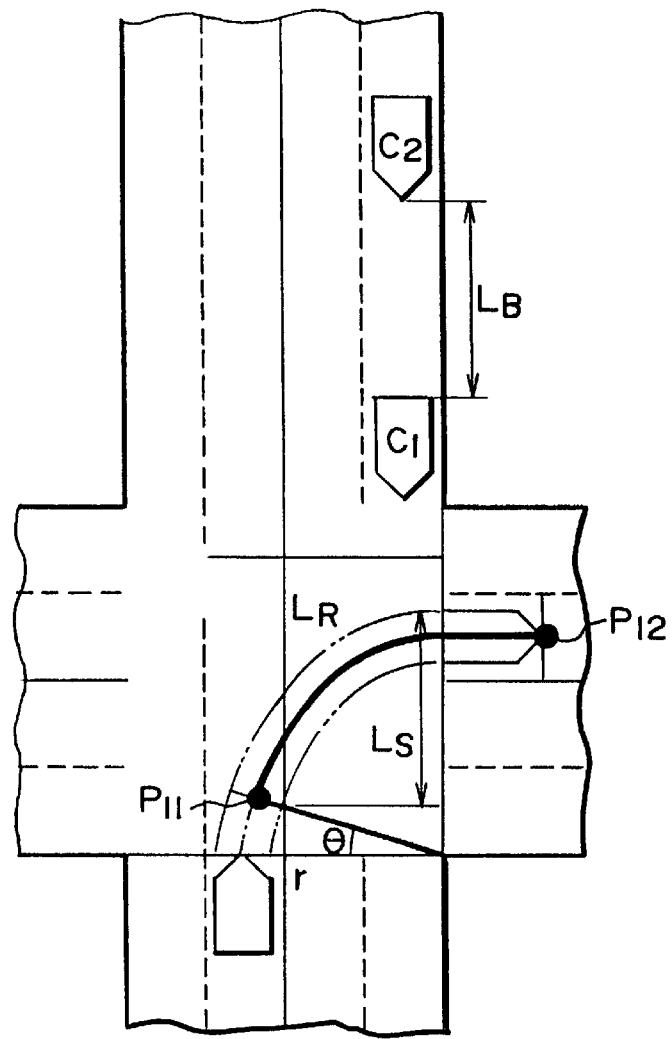
FIG. 23 is an explanatory view showing an operation sequence for preparation on the information concerning a group of vehicle in the system.

An operation for preparing data on a vehicle group is described below with reference to FIG. 23. In FIG. 23,
  $C_1$, $C_2$: Vehicles 1 and 2 running on the counter lane
  $V_1$, $V_2$: Velocities of the vehicles 1 and 2

$L_B$: Distance between $C_1$ and $C_2$ $P_1$: Point at which the vehicle turning to the right enters the counter lane $P_2$: Point at which the vehicle turning to the right passes through the counter lane $L_R$: Distance from $P_1$ to $P_2$ over which the vehicle turning to the right runs $V_R$: Velocity in right turn, 4.9 m/s $T_R$: Time required for the vehicle to run from point $P_1$ to point $P_2$ $L_S$: Distance over which the vehicle turning to the right runs from the point $P_1$, to point $P_2$ in the longitudinal direction of a lane (Distance over which the vehicle can move when turning to the right along a circle while the vehicle running on the counter lane is at stop)

The time $T_R$ required for the vehicle turning to the right to run from the point $P_{11}$ to the point $P_{12}$ can be calculated through the following equation 14:

$$T_R = \frac{L_R}{V_R} \qquad \text{Equation 14}$$

So the inter-vehicle distance $L_B$ required for turning to the right can be expressed by the equation 15:

$$L_{BO} = T_R \cdot v_2 \qquad \text{Equation 15}$$

The actual inter-vehicle distance $L_B$ detected by the vehicle detection means 1 between the vehicle $C_1$ and vehicle $C_2$ is larger than the inter-vehicle distance $L_{BO}$ expressed by the equation 15, it is recognized that the vehicle $C_2$ is a header of the vehicle group. In this case, it is based on the assumption that the inter-vehicle distance $L_B$ must be larger than the minimum inter-vehicle distance $L_S$ allowing right turn when the vehicle running on the counter lane is at stop. The relation is expressed by the following equation 16:

$$L_B > L_{BO} > \text{and } L_B > L_S \qquad \text{Equation 16}$$

EXAMPLE

The case where the vehicle on the counter lane is running at the velocity of 80 Km/h is described next.

The distance $L_R$ over which the vehicle turning to the right runs on the counter lane is expressed by the following equation 17:

$$L_R = r \cdot \left(\frac{\pi}{2} - \theta\right) + 4.7 \qquad \text{Equation 17}$$

wherein r indicates a radius of a circle along which the vehicle turning to the right runs and is 8.75 (m) and 4.7 (m) indicates length of the vehicle.

And, as $$\theta = \cos^{-1}\frac{7}{7.75} = 0.44 \text{ (rad)},$$

$L_R$ is equal to 4.7 (m). When this value is applied to the equation 14, the following value is obtained:

$$T_R = \frac{L_R}{V_R} = \frac{14.59}{4.9} \cong 3.0 \text{ (s)}$$

so that $L_S = 9.6 - r \sin \Theta = 6.15$ (m).

Therefore, when the vehicle on the counter lane is running at the velocity of 80 Km/h, the value of $L_{BO}$ can be calculated from the equation 15 as follows:

$$L_{BO} = T_R \cdot V_2 3.0 \times 22.2 \ 66.6 \text{ (m)}$$

and when the inter-vehicle distance to the vehicle running ahead is smaller than 66.6 m, the vehicle and the other group running ahead are regarded as members of the same vehicle group.

As described above, a collision in right/left turn prevention system according to the present invention comprises on-road facilities including vehicle running in the counter direction detection means, road surface conditions detection means, and on-road database means for storing therein information concerning road line forms; and a vehicle having vehicle position detection means for detecting a position of the vehicle, vehicle state detection means for detecting a state of the vehicle, determination processing means for selecting any of provision of information to a driver of the vehicle, generation of an alarm, and automatic control over the vehicle based on information concerning vehicles from the vehicle running in the counter direction detection means, information concerning road surface conditions from the road surface conditions from the road surface conditions detection means, and information concerning road line forms from the on-road database means, information output means for providing information or generating an alarm to the driver, and vehicle control means for automatically controlling running of the vehicle, and further comprises vehicle running in the counter direction detection means capable of reducing a volume of information concerning vehicles running in the counter direction by treating the vehicles as a plurality of groups, and determination/selection means for selecting any of provision of information to the driver, generation of an alarm, or control over the vehicle by using the information concerning groups of the vehicles running on the counter lane. Because of the features as described above, the collision in right/left turn prevention system can prevent occurrence of a collision by determining the possibility of a collision in right turn based on information concerning vehicles running in the counter direction collected by the on-road facilities and information concerning the vehicle itself and giving the information to a driver of the vehicle. Further when it is determined based on the information concerning vehicles running in the counter direction, information concerning road line forms, an information concerning the vehicle itself that there is the possibility of a collision in right turn of the vehicle, the system can provide the information to the driver or can provide automatic controls over the vehicle when the system determines that there is the possibility of occurrence of a collision because of inadequate deceleration by the driver. Therefore the collision in right/left turn prevention system according to the present invention can determines the possibility of a collision of a vehicle with another vehicle running in the counter direction when the vehicle tries to turn to the right or left at a crossing from performances of the vehicle and the other vehicle running in the counter direction, alert the driver of the necessity of deceleration, and prevent the driver from incorrectly determining on vehicles running on the counter or overlooking of a vehicle in a dead zone, so that the driver can easily and accurately manipulate the vehicle when turning to the right. Further when deceleration of the vehicle by the driver is insufficient and it is determined that there is the possibility of occurrence of a collision, the system can provide automatic control for stopping the vehicle. Because of the features as described above, there is provided the advantage that a frequency of a collision when a vehicle turns to the right or left can substantially be reduced.

What is claimed is:

1. A collision in right/left turn prevention system comprising:

an on-road facilities and a vehicle;

said on-road facilities comprising
- a vehicle detection means for detecting one or more of said vehicle,
- a road surface conditions detection means for detecting road surface conditions,
- an on-road database means for storing therein information concerning road line forms, and
- an on-road road-to-vehicle communications means for communication with one or more of said vehicle; and said vehicle having
- a vehicle position detection means for detecting a position of said vehicle,
- a vehicle state detection means for detecting a state of said vehicle,
- a vehicle road-to-vehicle communications means for communication with said on-road facilities,
- a determination processing means for selecting any one of providing information to a driver of said vehicle that said driver is required to perform normal braking operations, generating an alarm to said driver when a risk of a collision is determined, or automatically controlling said vehicle to prevent a collision, or a combination thereof, and
- a vehicle control means for automatically controlling the running of said vehicle when a risk of occurrence of a collision of said vehicle is determined by said determination processing means.

2. The collision in right/left turn prevention system of claim 1, wherein said on-road facilities further includes an on-road processing means for processing information concerning road surface conditions from said road surface conditions detection means and for processing information concerning road line forms from said on-road database means.

3. The collision in right/left turn prevention system of claim 1 or 2, wherein said determination processing means has
- a counter-vehicle's course estimation means for estimating an arrival time to a crossing and for estimating a position of a counter-vehicle running on the counter lane, and
- a vehicle's running course estimation means for estimating an arrival time to the crossing and for estimating a course of said vehicle by estimating the possibility of right turn of said vehicle.

4. The collision in right/left turn prevention system of claim 1, wherein said vehicle detection means reduces a volume of information concerning a collection of said vehicles running in the counter direction by treating the collection of vehicles as one group.

* * * * *